United States Patent
Deng et al.

(10) Patent No.: US 6,740,272 B1
(45) Date of Patent: May 25, 2004

(54) METHOD FOR HOT PRESSING CELLULOSIC AND LIGNOCELLULOSIC MATS

(75) Inventors: Xixian Deng, Sainte-Foy (CA); Yongqun Xie, Sainte-Foy (CA)

(73) Assignee: Forintek Canada Corp., Vancouver (CA)

( * ) Notice: Subject to any disclaimer, the term of this patent is extended or adjusted under 35 U.S.C. 154(b) by 0 days.

(21) Appl. No.: 10/429,722

(22) Filed: May 6, 2003

(51) Int. Cl.⁷ .......................... B29B 11/12; B29C 43/52

(52) U.S. Cl. ................. 264/120; 264/119; 264/40.1

(58) Field of Search ............................... 264/109–128, 264/40.1

(56) References Cited

U.S. PATENT DOCUMENTS 4,140,744 A * 2/1979 Karas et al. ................. 264/72
5,720,835 A * 2/1998 Lingart et al. .............. 264/113

FOREIGN PATENT DOCUMENTS

CA    2380651    2/2001

OTHER PUBLICATIONS

Vinogradov, V.A., "Analysis of Energy Parameters during the Vibrational Pressing Process", Mezhvuz. Sb. Nauch. Tr., Tekhnol. Oborud. Derevoobrabat. Proizv. (Kulikov, V.A., et al., ed.): 56–59 (1987 Leningrad).

* cited by examiner

Primary Examiner—Stephen J. Lechert, Jr.
(74) Attorney, Agent, or Firm—Oyen Wiggs Green & Mutala

(57) ABSTRACT

A method and system for pressing lignocellulosic and/or cellulosic materials to produce composite products such as medium density fiberboard subjects a mat of material to a alternating or vibratory force normal to the top face of the mat. The frequency of the alternating forces may be between 0.2 Hz and 2 Hz. This vibratory pressing action serves to cause heat to be transferred more quickly to the core of the mat from the surface, and reduces the pressing time required for thermosetting resins within the mat to cure. The system has a press for accepting the mat; a temperature sensor for sensing the temperature of the core of the mat; a control system for accepting a first signal from the temperature sensor and in response to that signal causing the press to apply vibratory forces to the mat normal to the surface of the mat when the core of the mat is below a predetermined temperature. The control system is also programmed to cause the press to apply a non-vibratory force to the mat normal to the surface of the mat when the core of the mat is above a predetermined temperature, that temperature being within the range of temperature at which the resin in the mat is capable of curing.

4 Claims, 1 Drawing Sheet

METHOD FOR HOT PRESSING CELLULOSIC AND LIGNOCELLULOSIC MATS

TECHNICAL FIELD

The present invention relates to pressing of materials to form pressed sheets of material, and more particularly to methods and systems for pressing lignocellulosic materials to produce composite wood products such as medium density fiberboard, oriented strand board and particle board.

BACKGROUND

There are many types of composite wood products formed from lignocellulosic material. Some examples include medium density fiberboard ("MDF"), oriented strand board ("OSB"), and particleboard. Others include laminated veneer lumber ("LVL"), laminated structural lumber (known in the art as "Glulam") and plywood. These composite products are generally made by adhering together wood materials such as lumber, veneers, strands, flakes, particles, and fibers with adhesives. Thermosetting adhesives are commonly used, which include phenol-formaldehyde (PF) resins, phenol-resorcinol-formaldehyde (PRF) resins, resorcinol-formaldehyde (RF) resins, urea formaldehyde (UF) resins, melamine urea formaldehyde (MUF) resin and isocyanate (MDI) resin.

Such composite wood products are typically produced by adding the adhesive to the lignocellulosic material and forming a mat of the combination. The mat is heated to within the range of temperature within which the adhesive cures, and is pressed for a period of time, allowing the resin to cure completely, or nearly completely. This process is well known in the art as "hot pressing".

The resins within the mat need to reach a certain elevated temperature to cure properly, and it is necessary that the entire volume of the mat reach this certain temperature to allow all of the resin in the mat to cure. When heat is applied to the mat in a typical hot pressing operation, however, it is only applied to one or both face surfaces of the mat. In a typical system, the conveyor belt on which the mat rides is heated and supplies heat directly to the mat. The heat is expected to be conducted from the surface of the mat to the core of the mat. Since wood is not a good conductor of heat, however, this conduction of heat inwardly from the surface of the mat is an inefficient way of heating the core of the mat, and while the resin near the surface of the mat may reach its curing temperature relatively quickly, it takes much longer for the core of the mat to reach this temperature.

It is accordingly desirable to attempt to heat the core of the mat more quickly to save time and production cost in the manufacture of composite wood products. Attempts have been made in the past to accomplish this by adding more heat to pressing systems by way of steam injection, and also by way of subjecting the mat to microwave and radio frequency radiation. These methods are not desirable, however, because they require great amounts of energy, and, especially in the case of radiation, require significant protective mechanisms which are cost-prohibitive.

Accordingly, an improved method and system for heating the core of a mat of lignocellulosic material to allow shorter pressing times is still required.

SUMMARY OF INVENTION

In its most basic form, the present invention is a method for decreasing the time required to heat the core of a mat of lignocellulosic material to a temperature at which an adhesive resin in the mat can cure. The method includes the step of providing alternating or vibratory forces to a mat of material while it is being pressed.

In a preferred embodiment, the method comprises the steps of heating the surface of the mat from some initial temperature to a temperature within the temperature range at which the resin cures; for a period of time before the core of the mat reaches the temperature range at which the resin cures, subjecting the mat to a vibratory pressing force normal to the surface of the mat; and following the vibratory pressing force, subjecting the mat to a non-vibratory pressing force.

In a preferred embodiment, the step of subjecting the mat to a vibratory pressing force comprises alternatingly providing a first force to the mat and a second force to the mat, the second force being less than the first force. The frequency of this alternating force may be between 0.2 Hz and 2 Hz.

The invention also provides a system for accomplishing this method, the system having a press for accepting the mat; a temperature sensor for sensing the temperature of the core of the mat; a control system for accepting a first signal from the temperature sensor and in response to that signal causing the press to apply vibratory forces to the mat normal to the surface of the mat when the core of the mat is below a predetermined temperature. The control system is also programmed to cause the press to apply a non-vibratory force to the mat normal to the surface of the mat when the core of the mat is above a predetermined temperature, that temperature being within the range of temperature at which the resin in the mat is capable of curing.

BRIEF DESCRIPTION OF DRAWINGS

In the accompanying drawings which illustrate specific embodiments of the invention, but which should not be construed as restricting the spirit or scope of the invention in any way.

DESCRIPTION

Figure 1:
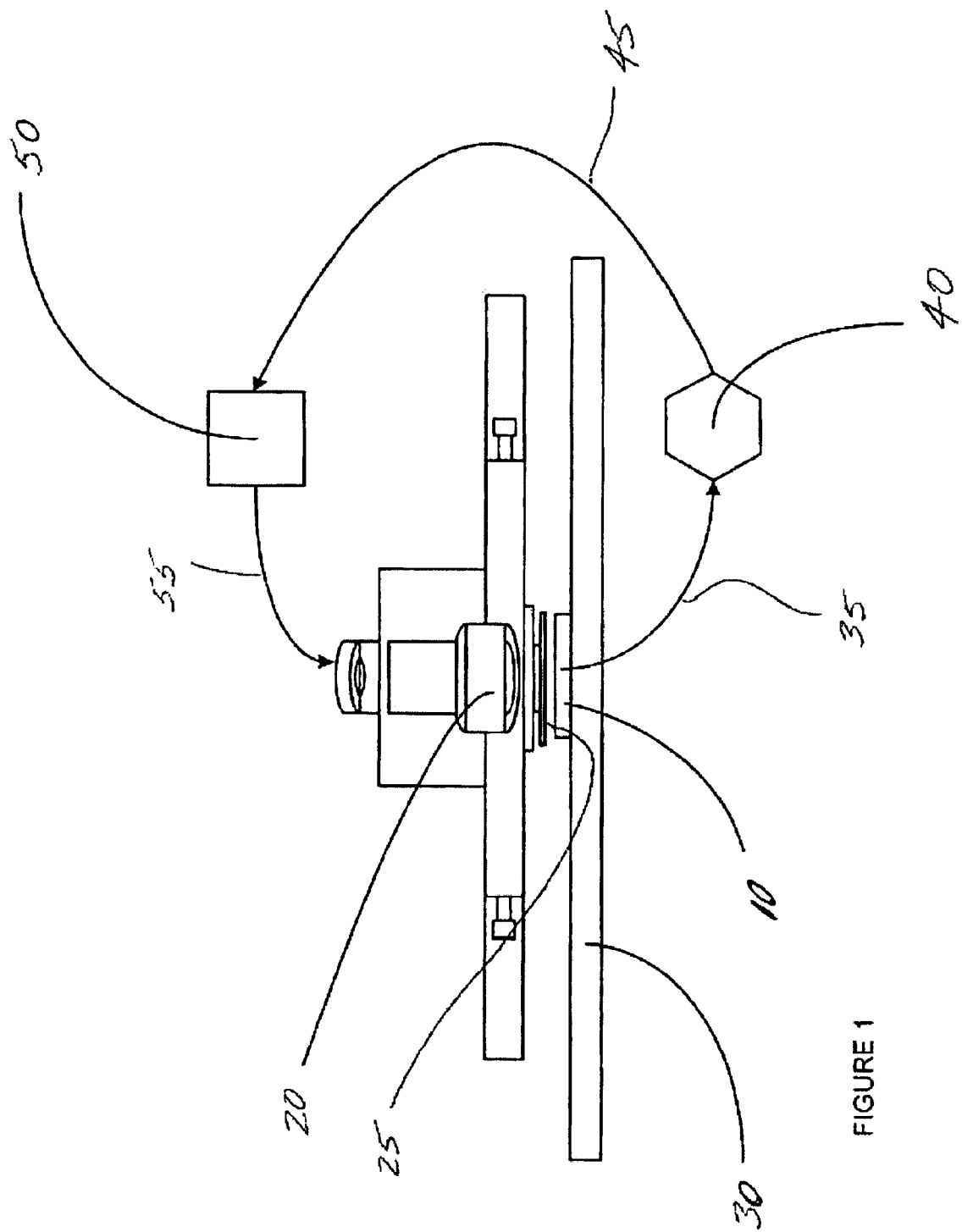
FIG. 1 is schematic view of a hot pressing system employing the method of the present invention.

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

Referring to FIG. 1, the hot pressing system of the present invention has a press 20 for pressing a mat of material 10. In a preferred embodiment of the invention, the material in mat 10 is a lignocellulosic material such as wood fibres used to produce MDF, in combination with a thermosetting adhesive such as a UF resin, although the invention contemplates use with any particulate materials which require hot pressing and which do not conduct heat well.

In the system described in FIG. 1, then, the press 20 may be provided in an MDF mill. Such a mill typically has a conveyor system 30 for conveying mat 10 to the pressing face 25 of press 20. This system may be provided in a continuous press, a multi-daylight press, or some other type of press known in the art. Press 20 is controlled by control system 50. This arrangement is well known in the art, and typically, when mat 10 is in place within press 20, press 20 is instructed by control system 50 to press mat 10 by forcing pressing face 25 against the top surface of mat 10 for a predetermined period of time. The time required for pressing mat 10 in known systems is widely variable, and depends upon the type of cellulosic material in mat 10, the type of adhesive therein, the moisture content of the mat, the ambient temperature of the system, the initial temperature within mat 10 and the vapour pressure within mat 10.

In the system of the present invention, there is further provided a sensor 40 for measuring the core temperature and/or vapour pressure of the mat. The particular nature of the sensor is not in and of itself important to the operation of the invention, and variations of such sensors will be well known to those in the art, but what is important is that the sensor is able to sense the temperature and/or vapour pressure within mat 10 while it is being pressed by press 20.

In operation, following the preparation of mat 10 (ie. the addition of a thermosetting adhesive to some cellulosic material), mat 10 is introduced to press 20 by conveyor 30. Mat 10 may be heated on its bottom surface by conduction of heat from conveyor 30, and may be further heated by conduction of heat from pressing face 25. Mat 10 may also be heated in some other manner, such as by the introduction of steam. In any case, mat 10 heats up when in place in press 20 being pressed. In a typical pressing system, mat 10 is pressed by pressing press face 25 against one surface of mat 10 with some original pressing force.

In the present system, while mat 10 is heating up, sensor 40 monitors the temperature of the core of mat 10 via signals 35. When the core of mat 10 reaches a first predetermined temperature, sensor 40 sends a signal 45 to press control system 50. Press control system 50 is programmed to provide signals 55, in response signal 45 from sensor 40, to press 20 to cause press face 25 to provide, alternatingly, a first force and a second, lesser force to mat 10 in a vibratory fashion. In other words, pressing face 25, as it is illustrated in FIG. 1, is caused to be lowered and raised, providing a vibratory force normal to the top face of mat 10. The second force provided by press face 25 need not be zero; rather it needs only be less than the first force. The first or second alternating force may be the same as the original pressing force, or may both be different.

These vibratory forces are provided to mat 10 until sensor 40 senses that the temperature of the core of mat 10 has reached a second predetermined temperature, still below the range of temperatures at which the resin within the mat begins to cure. At this temperature, control system 50 causes press 20 to press mat 10 with a constant, non-vibrating force.

Essentially, the vibrating forces applied to mat 10 are thought to serve to assist the transfer of heat from the surfaces of the mat to the core by way of convection. The inventors have determined that vibrations in the range of frequency of between 0.2 Hz and 2 Hz are suitably employed in the invention. The inventors have also determined that for a typical MDF mat, the press face can be raised and lowered in providing this vibratory force by between 0.2 mm and 3 mm. In experimental testing, the system has been found to reduce pressing time in the manufacture of MDF by 12%, with no degradation in the quality of the finished MDF panel.

As will be apparent to those skilled in the art in the light of the foregoing disclosure, many alterations and modifications are possible in the practice of this invention without departing from the spirit or scope thereof. For example, it is convenient but not essential that temperature of the core of mat 10 be monitored. Sensor 40 may also sense other parameters mat 10 which are indicative of the amount of heat within core 10, such as vapour pressure. The key to the invention is to provide a vibratory force to mat 10 during the time that the core of mat 10 is heating up to the range within which the adhesives within the mat begin to cure. Accordingly, the scope of the invention is to be construed in accordance with the substance defined by the following claims.

What is claimed is:

1. A method for pressing a mat of material having a thermosetting adhesive which has a temperature range at which it cures, the mat having an initial temperature below the temperature range at which it cures, and having at least one face surface, the method comprising the steps of:

a. heating the mat from the initial temperature to a temperature within the temperature range at which the resin cures;

b. for a period of time before the core of the mat reaches the temperature range at which the resin cures, subjecting the mat to a vibratory pressing force normal to the surface of the mat; and c. following the application of the vibratory pressing force, subjecting the mat to a non-vibratory pressing force.

2. The method of claim 1 wherein the step of subjecting the mat to a vibratory pressing force comprises alternatingly providing a first force to the mat and a second force, the second force less than the first force.

3. The method of claim 2 wherein the vibratory pressing force has a frequency of vibration of between 0.2 Hz and 2 Hz.

4. The method of claim 3 wherein the vibratory pressing force is provided by raising and lowering the press against the mat by a vertical distance of between 0.2 mm and 3 mm.

* * * * *